(12) United States Patent
Kume et al.

(10) Patent No.: US 6,573,332 B2
(45) Date of Patent: Jun. 3, 2003

(54) PROPYLENE-BASED COPOLYMER, PROCESS FOR PRODUCING THE SAME AND FILM COMPRISING THE SAME

(75) Inventors: Takanori Kume, Ichihara (JP); Shigeki Kishiro, Ichihara (JP); Kazuki Wakamatsu, Sodegaura (JP)

(73) Assignee: Sumitomo Chemical Company Limited, Osaka (JP)

( * ) Notice: Subject to any disclaimer, the term of this patent is extended or adjusted under 35 U.S.C. 154(b) by 0 days.

(21) Appl. No.: 09/938,501

(22) Filed: Aug. 27, 2001

(65) Prior Publication Data

US 2002/0049283 A1 Apr. 25, 2002

(30) Foreign Application Priority Data

Aug. 30, 2000 (JP) ........................................ 2000-260555

(51) Int. Cl.[7] ............................ C08F 10/00; C08L 23/10
(52) U.S. Cl. ........................ 525/191; 525/240; 428/500; 428/515
(58) Field of Search ................................. 525/191, 240; 428/500, 515

(56) References Cited

U.S. PATENT DOCUMENTS 6,110,986 A * 8/2000 Nozawa et al. ............. 521/142

FOREIGN PATENT DOCUMENTS

EP 0 577 407 A1 1/1994

* cited by examiner

*Primary Examiner*—Nathan M. Nutter
(74) *Attorney, Agent, or Firm*—Sughrue Mion, PLLC

(57) ABSTRACT

A propylene-based copolymer obtained by copolymerizing propylene with ethylene and/or an $\alpha$-olefins having 4 or more carbon atoms in the presence of a polymerization catalyst in a first step to produce a copolymer having a content of the $\alpha$-olefins of 1 mol % or more and less than 15 mol % and an ethylene content of 5 mol % or less in amount of 1 to 30% by weight as a copolymer component (A), and subsequently copolymerizing propylene with ethylene and/or an $\alpha$-olefins having 4 or more carbon atoms in a second step or later steps to produce a copolymer having a content of the $\alpha$-olefins of 15 to 30 mol % and an ethylene content of 5 mol % or less in amount of 70 to 99% by weight as a copolymer component (B).

9 Claims, No Drawings

PROPYLENE-BASED COPOLYMER, PROCESS FOR PRODUCING THE SAME AND FILM COMPRISING THE SAME

BACKGROUND OF THE INVENTION

1. Field of the Invention

The present invention relates to a propylene-based copolymer, a producing process thereof and film comprising the copolymer. More particularly, the present invention relates to a propylene-based copolymer having a practical transparency and excellent low-temperature heat sealability and rigidity, to a producing process thereof and to film comprising the copolymer.

2. Description of Related Arts

Polypropylene resins are excellent in transparency, heat-resistance, food hygiene and the like, and therefore, widely utilized in fields such as film, sheet and the like. Recently, with increase in bag production speed in packaging fields of foods and the like, materials having a low temperature heat sealability are desired.

As a polypropylene having a low temperature heat sealability, for example, JP-2882237B discloses a copolymer excellent in low temperature heat sealability obtained by copolymerizing propylene and an α-olefin other than propylene, or propylene, ethylene and an α-olefin other than propylene with a Ziegler-Natta catalyst, wherein the propylene content, ethylene content, α-olefin content and the content of 20° C. xylene soluble part are restricted to specified ranges. However, the random copolymer having a good low temperature heat sealability, namely being low in heat sealing temperature, is insufficient in rigidity, and therefore, further improvements have been required.

SUMMARY OF THE INVENTION

An object of the present invention is to provide a propylene-based copolymer having a practical transparency, and excellent low temperature heat sealability and rigidity.

Another object of the present invention is to provide a process for producing the propylene-based copolymer.

Still another object of the present invention is to provide film comprising the copolymer.

Other objects and advantages of the present invention will be apparent from the following description.

Namely, the present invention relates to a propylene-based copolymer obtained by copolymerizing propylene with ethylene and/or an α-olefins having 4 or more carbon atoms in the presence of a polymerization catalyst in a first step to produce a copolymer having a content of the α-olefins of 1 mol % or more and less than 15 mol % and an ethylene content of 5 mol % or less in amount of 1 to 30% by weight as a copolymer component (A), and subsequently copolymerizing propylene with ethylene and/or an α-olefins having 4 or more carbon atoms in a second step or later steps to produce a copolymer having a content of the α-olefins of 15 to 30 mol % and an ethylene content of 5 mol % or less in amount of 70 to 99% by weight as a copolymer component (B), to a process for producing the copolymer, and to film comprising the same.

The present invention will be illustrated in detail below.

DETAILED DESCRIPTION OF THE INVENTION

The propylene-based copolymer of the present invention is a copolymer obtained by copolymerizing propylene with an α-olefin having 4 or more carbon atoms and/or ethylene in a first step to produce a component(A), and subsequently copolymerizing propylene with an α-olefin having 4 or more carbon atoms and/or ethylene in a second step or later steps to produce a component (B). The component (A) is preferably a copolymer component obtained by copolymerizing propylene with an α-olefin having 4 or more carbon atoms, and the component (B) is preferably a copolymer component obtained by copolymerizing propylene with an α-olefin having 4 or more carbon atoms.

The content of the component (A) is from 1 to 30% by weight, preferably from 5 to 30% by weight, more preferably from 5 to 20% by weight. The content of the component (B) is from 70 to 99% by weight, preferably from 70 to 95% by weight, more preferably from 80 to 95% by weight. The sum of the components (A) and (B) is 100% by weight.

When the content of the component (A) is less than 1% by weight, properties of polymer powder formed in copolymerization may be deteriorated to decrease productivity, and when the content of the component (a) is over 30% by weight, the low temperature heat sealability of a film made of the copolymer may be insufficient.

The content of the α-olefin having 4 or more carbon atoms contained in the component (A) is 1 mol % or more and less than 15 mol %, preferably 5 mol % or more and less than 15 mol %, more preferably from 5 to 10 mol %. When the content of the α-olefins having 4 or more carbon atoms contained in the component (A) is less than 1 mol %, processability may be insufficient, and when 15 mol % or more, it may be difficult in some cases to stably produce the component (A).

The content of the α-olefin having 4 or more carbon atoms contained in the component (B) is from 15 to 30 mol %, preferably from 15 to 25 mol %. When the content of the α-olefin having 4 or more carbon atoms contained in the component (B) is less than 15 mol %, the low temperature heat sealability of film may be insufficient, and when over 30 mol %, the rigidity of film may decrease.

The ethylene content in the component (A) is 5 mol % or less, preferably 3 mol % or less. The ethylene content in the component (B) is also 5 mol % or less, preferably 3 mol % or less. When the content of ethylene in the component (A) or (B) is over 5 mol %, film may be whitened with the lapse of time and the rigidity thereof may decrease.

Herein, the sum of propylene and an α-olefin having 4 or more carbon atoms and ethylene is 100 mol %.

Examples of the α-olefin having 4 or more carbon atoms include, for example, 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-buene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, 1-dodecene and the like are exemplified, and preferable are 1-butene, 1-pentene, 1-hexene and 1-octene, further preferable are 1-butene and 1-hexene from the standpoints of copolymerization property and economy and the like.

As the component (A) or (B), for example, a propylene-1-butene copolymer component, propylene-1-hexene copolymer component, propylene-ethylene-1-butene copolymer component, propylene-ethylene-1-hexene copolymer component and the like are listed, and preferable are a propylene-1-butene copolymer component and propylene-1-hexene copolymer component. The components (A) and (B) may be the same or different in combination of the monomers to be copolymerized.

As the propylene-based copolymer of the present invention, for example, a (propylene-1-butene)-(propylene-1-butene) copolymer, (propylene-1-butene)-(propylene-ethylene-1-butene) copolymer, (propylene-ethylene-1-butene)-(propylene-1-butene) copolymer, (propylene-ethylene-1-butene)-(propylene-ethylene-1-butene) copolymer, (propylene-1-hexene)-(propylene-1-hexene) copolymer and the like are listed, and a (propylene-1-butene)-(propylene-1-butene) copolymer and (propylene-1-hexene)-(propylene-1-hexene) copolymer, and further preferable is a (propylene-1-butene)-(propylene-1-butene) copolymer.

The melt flow rate (hereinafter, sometimes abbreviated as "MFR") measured at 230° C. under a load of 21.18N according to JIS K7210 of the propylene-based copolymer of the present invention is not particularly limited, but preferably from 0.1 to 50 g/10 minutes, more preferably from 1 to 20 g/10 minutes, from the standpoint of flowability or film formability.

The MFR of the propylene-based copolymer may be changed by a known method during melt-kneading. For example, a method of adding an organic peroxide to the propylene-based copolymer and the like so far as the object and effect of the present invention are not damaged, are listed.

Production of the propylene-based copolymer of the present invention can be conducted by multi-step polymerization composed of a first step, and a second step or later steps, using a known polymerization catalyst in a known polymerization method except that the copolymer components (A) and (B) are adjusted to the specific ranges described as above.

As the polymerization catalyst, preferably stereoregular polymerization catalysts such as Ziegler-Natta catalysts, metallocene-based catalysts and the like, are preferably listed, and catalysts containing Ti, Mg and a halogen as essential components are more preferable. For example, there are Ti—Mg-based catalysts obtained by using a solid catalyst component obtained by combining a magnesium compound with a Ti compound, and catalyst systems obtained by combining the solid catalyst component and an organoaluminum compound, and optionally, a third component such as an electron donative component or the like, and there are exemplified catalyst systems described in JP61-218606A, JP61-287904A and JP07-216017A, and the like.

The organoaluminum compound is not particularly restricted, and preferable are triethylaluminum, triisobutylaluminum, a mixture of triethylaluminum and diethylaluminum chloride, and tetraethyldialumoxane.

The electron donative compound is not particularly restricted, and cyclohexylethyldimethoxysilane, tert-butyl-n-propyldimethoxysilane, tert-butylethyldimethoxysilane and dicyclopentyldimethoxysilane are preferable.

As the polymerization method, there are listed a solvent polymerization using an inert solvent represented by a hydrocarbon solvent such as hexane, heptane, octane, decane, cyclohexane, methylcyclohexane, benzene, toluene, xylene or the like, a bulk polymerization using a liquefied monomer as a solvent, a gas phase polymerization conducted in a gaseous monomer, and the like, and preferable are a bulk polymerization and gas phase polymerization in which post treatment and the like are easy. These polymerization methods may be conducted batch-wise or continuously.

In the process of producing the propylene-based copolymer of the present invention, the polymerization is conducted in multi-stage composed of a first step and a second step (in case of two steps) or a first step and later steps (in case of more than two steps), in the above-mentioned polymerization. The polymerization method of the first step and the polymerization method of the second step or later steps may be the same or different, and preferably, from the standpoints of polymerization activity and easiness of post-treatment, the first step is a step in which polymerization is conducted in the absence of an inert solvent and the second or later steps are a step in which polymerization is conducted in gas phase. Polymerization of the first step and polymerization of the second or later step may be conducted in the same polymerization reactor, or conducted in different polymerization reactors.

As the method of producing the propylene-based copolymer of the present invention, there are listed, for example, a solvent—solvent polymerization method, bulk—bulk polymerization method, gas phase-gas phase polymerization method, solvent-gas phase polymerization method, bulk-gas phase-gas phase polymerization method, solvent-gas phase-gas phase polymerization method, bulk-gas phase-gas phase polymerization method and the like, and preferable are a bulk-gas phase polymerization method, gas phase-gas phase polymerization method and bulk-gas phase-gas phase polymerization method.

The polymerization temperature in the first step is not particularly restricted, usually from 20 to 150° C., and from the standpoints of productivity and control of contents of the component (A) and the component (B), preferably from 35 to 95° C. The polymerization temperature of the second or later steps may be the same as or different from the polymerization temperature of the first step, and is usually from 20 to 150° C., preferably from 35 to 95° C.

In the method of producing the propylene-based copolymer, catalyst deactivation, de-solvent, de-monomer, drying, granulation and the like as post-treatments may be conducted.

To the propylene-based copolymer, additives and other resins may be added. As the additives, for example, antioxidants, ultraviolet absorbers, antistatic agents, lubricants, nucleating agents, tackifiers, anti-fogging agents, and the like are listed.

As the other resins, for example, polyethylene-based resins, polypropylene-based resins, other polyolefin-based resins and the like are listed.

The film of the invention is a film containing a film layer made of the propylene-based copolymer, and includes mono-layer film of the propylene-based copolymer, multi-layer film having at least two layers and containing the film layer of the propylene-based copolymer, and the like. These films are suitable for packaging film. The packaging film includes, for example, a food packaging film, clothing packaging film, and the like, preferably a food packaging film.

As the method of producing the film of the present invention, there are listed an inflation method, T die method, calender method and the like. And, a method of producing a single film of the propylene-based copolymer, using these methods, and method of producing a multi-layer film containing at least one layer of the propylene-based copolymer and at least one layer of a different resin, are illustrated.

Methods of forming a multi-layer structure, there are listed a co-extrusion molding method, extrusion lamination method, heat lamination method, dry lamination method and the like, usually used. A co-extrusion molding method is preferable from the standpoint of balance of properties such as the low temperature heat sealability, transparency and rigidity of film obtained.

EXAMPLES

The following Examples illustrate the present invention specifically, but the present invention is not limited thereto. Methods of preparing samples used in the Examples and Comparative Examples and methods of measuring physical properties thereof are descried below.

(1) Contents of the Copolymer Components (A) and (B) in the Propylene-Based Copolymer (% by Weight)

It was determined from the material balance.

(2) 1-butene Content (Unit: mol %)

1-buten contents in the copolymer component (A) and the propylene-based copolymer were respectively determined by IR spectrum measurement described in "Polymer Handbook" (published by Kinokuniya Shoten, 1995), page 619.

1-butene content in the copolymer component (B) was determined by calculation the following equation:

Content $BB=\{contentBP \times 100-(content\ BA) \times (content\ A)\}/content\ (B)$, wherein content BB is a 1-butene content in the copolymer component (B), content BP is a 1-butene content in the propylene-based copolymer, content BA is a 1-butene content in the copolymer component (A), content A is a content of the copolymer component (A) in the propylene-based copolymer, content B is a content of the copolymer component (B) in the propylene-based copolymer.

(3) Haze (Unit: %)

It was measured according to JIS K7105.

(4) Heat Seal Temperature (HST) (Unit: °C.)

The heat sealing was effected by using a heat gradient tester manufactured by Toyo Seiki K. K. at an interval of 2° C. under conditions of a width of 15 mm, a sealing pressure of 1 kg/cm$^2$ and a time of 1 second. The resulted film was left at 23° C. for more than 24 hours, then, heat seal strengths were measured by effecting T-type peeling at a speed of 200 mm/min. at 23° C. using a tensile tester, and the temperature when the heat seal strength was 300 g was determined.

(5) Young Modulus (YM) (Unit: kg/cm$^2$)

Test pieces having a width of 20 mm were sampled along the machine direction (MD) and the transverse direction (TD) from a film after film formation, and an S—S curve was made by a tensile tester (YZ100×2CTII, manufactured by Yasuda Seiki Seisakusho K. K.) at a chuck distance of 60 mm and a tensile speed of 5 mm/min., and the initial elastic modulus was measured.

Example 1

[Synthesis of Solid Catalyst Component]

After an atmosphere in a 200 L SUS-reactor equipped with a stirrer was replaced with nitrogen, and 80 L of hexane, 6.55 mol of tetrabutoxytitanium, 2.8 mol of diisobutyl phthalate, and 98.9 mol of tetrabutoxysilane were charged therein to obtain a homogeneous solution. Next, 51 L of diisobutyl ether solution of butylmagnesiumchloride (concentration; 2.1 mol/L) was gradually added to the solution dropwise over 5 hours while the temperature in the reactor was kept at 5° C. After the dropwise addition, the solution was further stirred for one hour at room temperature. Then, the resulted mixture was subjected to solid-liquid separation to obtain a solid. The solid was washed three times with 70 L of toluene. Then, after toluene was drown out so that the slurry concentration was adjusted to 0.6 kg/L, a mixed liquid of 8.9 mol of di-n-butyl ether and 274 mol of titanium tetrachloride was added, and thereafter, 20.8 mol of phthaloyl chloride was added to carry out a reaction at 110° C. for 3 hours. After the reaction, the resulting solid was washed twice with toluene at 95° C. Next, after the slurry concentration was adjusted to 0.6 kg/L, 3.13 mol of diisobutyl phthalate, 8.9 mol of di-n-butylether and 137 mol of titanium tetrachloride were added thereto, and the reaction was carried out at 105° C. for 1 hour. After the reaction, the resulting mixture was subjected to solid-liquid separation at the same temperature to obtain a solid, and then the solid was washed twice with 90 L of toluene at 95° C.

Next, after the slurry concentration was adjusted to 0.6 kg/L, 8.9 mol of di-n-butyl ether and 137 mol of titanium tetrachloride were added thereto, and the reaction was carried out at 95° C. for 1 hour. After the reaction, the resulting mixture was subjected to solid-liquid separation at the same temperature to obtain a solid, and then the solid was washed thrice with 90 L of toluene at the same temperature.

Further, after the slurry concentration was adjusted to 0.6 kg/L, 8.9 mol of di-n-butyl ether and 137 mol of titanium tetrachloride were added thereto, and the reaction was carried out at 95° C. for 1 hour. After the reaction, the resulting mixture was subjected to solid-liquid separation at the same temperature to obtain a solid, and then the solid was washed thrice with 90 L of toluene at the same temperature, and then thrice with 90L of hexane. Thereafter, the solid was dried under reduced pressure to obtain 1 kg of a solid catalyst component. The solid catalyst component contained 1.89% by weight of Ti atom, 20% by weight of magnesium atom, 8.6% by weight of phthalic acid ester, 0.05% by weight of ethoxy group and 0.21% by weight of butoxy group and had good particle properties containing no fine powder.

[Preliminary Activation of Solid Catalyst Component]

To a SUS autoclave having an inner volume of 3 L, equipped with a stirrer, 1.5 L of hexane sufficiently dehydrated and deaerated, 37.5 millimol of triethylaluminum, 3.75 millimol of t-butyl-n-propyldimethoxysilane, and 15 g of the solid catalyst component described above were added, 15 g of propylene was continuously fed over 30 minutes while the temperature in the reactor was kept at 5 to 15° C. to carry out preliminary activation, then the resulting solid catalyst slurry was transferred to a SUS autoclave having an inner volume of 200 L, equipped with stirrer and subsequently 140 L of liquid butane was add thereto to dilute it, and kept at lower than 5° C.

[Polymerization]

(First Step)

In a SUS polymerization vessel having an inner volume of 300 L, equipped with a stirrer, 35 kg/hr of liquid propylene, 13 kg/hr of 1-butene and hydrogen in an amount so that the concentration of the gas phase is kept at 0.5% by volume were fed, further 0.6 g/hr of the preliminary activated catalyst was fed, and thereafter, bulk polymerization in which liquid propylene was used as a medium, was continuously carried out at 60° C. under a condition in which the amount of slurry substantially retained in the vessel was kept 90 L. The amount of a polymer produced was 2.0 kg/hr, and when a part of a polymer was analyzed, the butene content was 9.2 mol %. The obtained slurry containing the polymer was continuously transferred to a polymerization vessel of a second step without deactivated.

[Second Step]

In a gas phase fluidized bed reactor having an inner volume of 1 m$^3$, equipped with a stirrer, under feed conditions of propylene, hydrogen and 1-butene so that 80 kg of a polymer retention amount, 65° C. of a polymerization temperature, 1.15 MPa of a polymerization pressure, 2.5% by volume of hydrogen concentration of gas phase, and 25% by volume of 1-butene concentration of gas phase were kept, the solid catalyst-containing polymer transferred from the first step vessel, 50 millimol/hr of triethylaluminum and 5 millimol/hr of t-butyl-n-propyldimethoxysilane were fed to continue the continuous polymerization for obtaining a polymer of 22.2 kg/hr. The 1-butene content of the polymer was 19.7 mol %. The weight ratio of the polymer obtained in the first step (component (A)) to that obtained in the second step (component (B)) was 9/91 from the amounts of polymer produced in respective steps, and the content of 1-butene in the component (B) was 20.7 mol %. Namely, the propylene-based copolymer obtained has a component (A) content of 9% by weight, a component (B) content of 91% by weight, a 1-butene content in the component (A) of 9.2 mol %, a 1-butene content in the component (B) of 20.7 mol %, and a 1-butene content in the propylene-based copolymer of 19.7 mol %.

[Preparation of Film]

0.05 parts by weight of calcium stearate, 0.15 parts by weight of Irganox 1010(manufactured by Ciba specialties K.K.), 0.05 parts by weight of Irgafos 168 (manufactured by Ciba specialties K.K.), 0.11 parts by weight of erucamide, and 0.16 parts by weight of sylysia 550(Fuji Silysia K.K.) per 100 parts by weight of the propylene-based copolymer were mixed therewith and melt-kneaded to obtain pellet.

The pellet was extruded using an 50 mm φ extruder equipped with a coat hunger type T die of 400 mm in width, at a resin temperature of 250° C. at a discharge rate of 12 kg/hr, and cooled by an air chamber cooling method at a chill roll temperature of 40° C. and lines rate of 20 m/min. to prepare film having a thickness of 30 μm. Physical properties of the film obtained are shown in Table 1.

Example 2

The same solid catalyst as that used in Example 1 was used, and preliminary activation was carried out in the same manner as in Example 1.

[Polymerization]
(First Step)

In a SUS polymerization vessel having an inner volume of 300 L, equipped with a stirrer, 35 kg/hr of liquid propylene, 8.5 kg/hr of 1-butene, and hydrogen in an amount so that the concentration of the gas phase was kept at 0.5% by volume were fed, further 0.55 g/hr of the preliminary activated catalyst was fed, and thereafter, bulk polymerization in which liquid propylene was used as a medium, was continuously carried out at 60° C. under a condition in which the amount of slurry substantially retained in the vessel was kept 90 L. The amount of a polymer produced was 2.0 kg/hr, and when a part of a polymer was analyzed, the butene content was 6.6 mol %. The obtained slurry containing the polymer was continuously transferred to a polymerization vessel of the second step without deactivated.

[Second Step]

In a gas phase fluidized bed reactor having an inner volume of 1 m³ equipped with a stirrer, under feed conditions of propylene, hydrogen and 1-butene so that 80 kg of a polymer retention amount, 65° C. of a polymerization temperature, 1.15 MPa of a polymerization pressure, 2.5% by volume of hydrogen concentration of gas phase, and 26.5% by volume of 1-butene concentration of gas phase were kept, the solid catalyst-containing polymer transferred from the first step vessel, 50 millimol/hr of triethylaluminum and 5 millimol/hr of t-butyl-n-propyldimethoxysilane were fed to continue the continuous polymerization for obtaining a polymer of 20.0 kg/hr. The 1-butene content of the polymer was 20.3 mol %. The weight ratio of the polymer obtained in the first step (component (A)) to that obtained in the second step (component (B)) was 10/90 from the amounts of polymer produced in respective steps, and the content of 1-butene in the component (B) was 21.8 mol %. Namely, the propylene-based copolymer obtained has a component (A) content of 10% by weight, a component (B) content of 90% by weight, a 1-butene content in the component (A) of 6.6 mol %, a 1-butene content in the component (B) of 21.8 mol %, and a 1-butene content in the propylene-based copolymer of 20.3 mol %.

The obtained propylene-based copolymer was pelletized and formed into film in the same manner as in Example 1. Physical properties of thus obtained film are shown in Table 1.

Comparative Example 1

[Synthesis of Solid Catalyst]

After an atmosphere in a 200 L SUS reactor equipped with a stirrer was replaced with nitrogen, and 80 L of hexane, 6.55 mol of tetrabutoxytitanium,2.8 mol of diisobutyl phthalate, and 98.9 mol of tetrabutoxysilane were charged therein to obtain a homogeneous solution. Next, 51 L of diisobutyl ether solution of butylmagnesiumchloride (concentration; 2.1 mol/L) was gradually added to the solution dropwise over 5 hours while the temperature in the reactor was kept at 5° C. After the dropwise addition, the obtained solution was further stirred for one hour at 5° C. and additional one hour at room temperature. Then, the resulted mixture was subjected to solid-liquid separation to obtain a solid. The solid was washed three times with 70 L of toluene. Then, after the amount of toluene was controlled so that the slurry concentration was adjusted to 0.2 kg/L, the slurry was stirred at 105° C. for 1 hr. Thereafter, the slurry was cooled to 95° C., and then 47.6 mol of diisobutyl phthalate was added thereto to carry out a reaction for 30 minutes at 95° C. The resulting solid was washed twice with toluene.

Thereafter, after the amount of toluene was controlled so that the slurry concentration was adjusted to 0.4 kg/L, a 3.1 mol of diisobutyl phthalate, 8.9 mol of di-n-butyl ether and 274 mol of titanium tetrachloride were added, and then reacted 3 hours at 105° C.

After the reaction, the resulting mixture was subjected to solid-liquid separation at the same temperature to obtain a solid, and then the solid was washed twice with 90 L of toluene at the same temperature.

Next, after the amount of toluene was controlled so that the slurry concentration was adjusted to 0.4 kg/L, 8.9 mol of di-n-butylether and 137 mol of titanium tetrachloride were added thereto, and the reaction was carried out at 105° C. for 1 hour. After the reaction, the resulting mixture was subjected to solid-liquid separation at the same temperature to obtain a solid, and then the solid was washed thrice with 90 L of toluene at the same temperature, further was washed thrice with 70 L of hexane and dried under reduced pressure to obtain 11.4 kg of a solid catalyst component.

The solid catalyst component contained 1.83% by weight of Ti atom, 8.4% by weight of phthalic acid ester, 0.30% by weight of ethoxy group and 0.20% by weight of butoxy group.

[Preliminary Activation of Solid Catalyst Component]

To a SUS autoclave having an inner volume of 3 L, equipped with a stirrer, 1.5 L of hexane sufficiently dehydrated and deaerated, 37.5 millimol of triethylaluminum, 37.5 millimol of t-butyl-n-propyldimethoxysilane, and 21 g of the solid catalyst component described above were added, 21 g of propylene was continuously fed over 30 minutes while the temperature in the reactor was kept at 5 to 15° C. to carry out preliminary activation, then the resulting solid catalyst slurry was transferred to a SUS autoclave having an inner volume of 200 L, equipped with a stirrer and subsequently 140 L of liquid butane was add thereto to dilute it, and kept at 5° C. or less.

[Polymerization]

In a gas phase fluidized bed reactor having an inner volume of 1 m$^3$, equipped with a stirrer, under feed conditions of propylene, hydrogen and 1-butene so that 60 kg of a polymer retention amount, 65° C. of a polymerization temperature, 1.15 MPa of a polymerization pressure, 1.0% by volume of hydrogen concentration of gas phase, and 21% by volume of 1-butene concentration of gas phase were kept, 0.8 g/hr of the solid catalyst component preliminary activated, 50 millimol/hr of triethylaluminum and 15 millimol/hr of t-butyl-n-propyldimethoxysilane were fed to continue the continuous polymerization for obtaining a polymer of 19.8 kg/hr. The 1-butene content of the polymer was 17.5 mol %. The obtained polymer was pelletized and formed into film in the same manner as in Example 1. The physical properties of thus obtained film are shown in Table 1.

Comparative Example 2

Polymerization was carried out in the same manner as in Comparative Example 1 except that the 1-butene concentration of gas phase was changed to 22.9% by volume. However, the polymerization had to be discontinued because discharge of the polymer from the polymerization reactor became impossible due to rapid increase of polymer agglomerates. The polymer sample collected in a small amount had a 1-butene content of 19% by mol.

TABLE 1

|  | Haze (%) | Heat seal Temperature (° C.) | Young modulus (kgf/cm$^2$) | |
| --- | --- | --- | --- | --- |
|  |  |  | MD | TD |
| Example 1 | 4.9 | 116 | 3900 | 3900 |
| Example 2 | 6.7 | 114 | 3600 | 3700 |
| Comparative Example 1 | 7.3 | 122 | 4600 | 4600 |

According to the present invention, a propylene-based copolymer having a practical transparency and excellent low temperature heat sealability and rigidity, a process for producing the same and a film comprising the same, are provided.

What is claimed is:

1. A propylene-based copolymer comprising 1 to 30% by weight of a copolymer component (A) having a content of an α-olefin having 4 or more carbon atoms of 1 mol % or more and less than 15 mol % and an ethylene content of 5 mol % or less and 70 to 99% by weight of a copolymer component (B) having a content of an α-olefin having 4 or more carbon atoms of 15 to 30 mol % and an ethylene content of 5 mol % or less, the propylene-based copolymer being obtained by a process comprising:

copolymerizing propylene with an α-olefin having 4 or more carbon atoms and optionally ethylene in the presence of a polymerization catalyst to produce the copolymer component (A) in an amount of 1 to 30% by weight; and subsequently copolymerizing, in the presence of the copolymer component (A) formed in the previous copolymerization, propylene with an α-olefin having 4 or more carbon atoms and optionally ethylene to produce the copolymer component (B) in an amount of 70 to 99% by weight.

2. The propylene-based copolymer according to claim 1, the copolymer components (A) and (B) are respectively a copolymer of propylene with an α-olefin having 4 or more carbon atoms.

3. The propylene-based copolymer according to claim 1, the α-olefin having 4 or more carbon atoms is 1-butene or 1-hexene.

4. A process for producing a propylene-based copolymer comprising 1 to 30% by weight of a copolymer component (A) having a content of an α-olefin having 4 or more carbon atoms of 1 mol % or more and less than 15 mol % and an ethylene content of 5 mol % or less and 70 to 99% by weight of a copolymer component (B) having a content of an α-olefin having 4 or more carbon atoms of 15 to 30 mol % and an ethylene content of 5 mol % or less, the process comprising:

copolymerizing propylene with an α-olefin having 4 or more carbon atoms and optionally ethylene in the presence of a stereoregular polymerization catalyst in a first step to produce the copolymer component (A) in an amount of 1 to 30% by weight; and subsequently copolymerizing, in the presence of the copolymer component (A) formed in the previous copolymerization, propylene with an α-olefin having 4 or more carbon atoms and optionally ethylene in a second step or later steps to produce the copolymer component (B) in an amount of 70 to 99% by weight.

5. The process according to claim 4, wherein the copolymerization in the first step is carried out in the absence of an inert solvent and the copolymerization in the second step or later steps is carried out in a gas phase.

6. The process according to claim 4, wherein the copolymer components (A) and (B) are respectively a copolymer of propylene with an α-olefin having 4 or more carbon atoms.

7. The process according to claim 4, wherein the α-olefin having 4 or more carbon atoms is 1-butene or 1-hexane.

8. A film comprising the propylene-based resin of claim 1.

9. A packaging film comprising at least one layer of the propylene-based resin of claim 1.

* * * * *